(12) United States Patent
Woo (10) Patent No.: US 10,655,599 B2
(45) Date of Patent: May 19, 2020

(54) WIND FARM, CONTROL METHOD THEREOF AND WIND POWER GENERATION UNIT

(71) Applicant: DOOSAN HEAVY INDUSTRIES & CONSTRUCTION CO., LTD., Gyeongsangnam-do (KR)

(72) Inventor: Sang Woo Woo, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 939 days.

(21) Appl. No.: 14/338,809

(22) Filed: Jul. 23, 2014

(65) Prior Publication Data
US 2015/0184631 A1  Jul. 2, 2015

(30) Foreign Application Priority Data

Dec. 27, 2013  (KR) .................. 10-2013-0164762

(51) Int. Cl.
| F03D 7/00 | (2006.01) |
| F03D 9/25 | (2016.01) |
| F03D 7/04 | (2006.01) |
| F03D 17/00 | (2016.01) |
| F03D 7/02 | (2006.01) |

(Continued)

(52) U.S. Cl.
CPC .............. *F03D 7/00* (2013.01); *F03D 7/048* (2013.01); *F03D 9/257* (2017.02); *F03D 17/00* (2016.05); *F03D 80/00* (2016.05); *F03D 80/80* (2016.05); *F03D 7/0244* (2013.01); *F05B 2270/32* (2013.01); *F05B 2270/321* (2013.01);

(Continued)

(58) Field of Classification Search
CPC . F03D 7/00; F03D 17/00; F03D 7/048; F03D 7/0244; F05B 2270/32; F05B 2270/321; F05B 2270/322; Y02E 10/723
See application file for complete search history.

(56) References Cited

U.S. PATENT DOCUMENTS

| 6,837,681 B2 * | 1/2005 | Wobben ................ F03D 7/0264 |
| | | 415/1 |
| 7,025,567 B2 * | 4/2006 | Wobben ................ F03D 7/0224 |
| | | 415/118 |

(Continued)

FOREIGN PATENT DOCUMENTS

| EP | 2055941 A2 | 5/2009 |
| EP | 2251543 A1 | 11/2010 |

(Continued)

OTHER PUBLICATIONS

Extended European Search Report dated May 26, 2015 in corresponding European Patent Application No. 14179349.7-1607.

(Continued)

*Primary Examiner* — Igor Kershteyn
*Assistant Examiner* — Jason G Davis
(74) *Attorney, Agent, or Firm* — Investone Patent, LLC (57) ABSTRACT

A wind farm that includes a plurality of wind power generation units. The wind farm further includes a sensing part and a controlling part. The sensing part is configured to sense an external environment risk element. The controlling part is configured to receive a risk signal from the sensing part and to control the wind power generation units in the wind farm.

17 Claims, 8 Drawing Sheets

(51) Int. Cl.
  *F03D 80/80* (2016.01)
  *F03D 80/00* (2016.01)
(52) U.S. Cl.
  CPC ....... *F05B 2270/322* (2013.01); *Y02E 10/723* (2013.01); *Y02E 10/725* (2013.01)

(56) References Cited

U.S. PATENT DOCUMENTS

| | | | |
|---|---|---|---|
| 7,488,155 B2* | 2/2009 | Barbu | F03D 7/0224 416/1 |
| 8,987,929 B2* | 3/2015 | Jayant | F03D 7/0204 290/44 |
| 9,366,235 B2* | 6/2016 | Evans | F03D 17/00 |
| 2003/0165379 A1 | 9/2003 | Wobben | |
| 2004/0258521 A1* | 12/2004 | Wobben | F03D 7/0224 416/37 |
| 2007/0124025 A1* | 5/2007 | Schram | F03D 7/0224 700/287 |
| 2008/0198027 A1* | 8/2008 | Bugge | G01N 21/3504 340/632 |
| 2009/0099702 A1* | 4/2009 | Vyas | F03D 7/0292 700/287 |
| 2009/0110539 A1 | 4/2009 | Uphues | |
| 2011/0193344 A1* | 8/2011 | Lafferty | F03D 7/047 290/44 |
| 2012/0091724 A1* | 4/2012 | Bodenstein | H02K 7/102 290/55 |
| 2012/0200086 A1 | 8/2012 | Kang et al. | |
| 2013/0103202 A1* | 4/2013 | Bowyer | F03D 7/0292 700/275 |
| 2013/0116831 A1 | 5/2013 | Rogers et al. | |
| 2013/0166082 A1* | 6/2013 | Ambekar | G05B 13/04 700/287 |
| 2013/0207392 A1* | 8/2013 | McCorkendale | F03D 7/048 290/44 |
| 2014/0010651 A1* | 1/2014 | Nies | F03D 80/00 416/1 |
| 2014/0336833 A1* | 11/2014 | Marinopoulos | G01W 1/10 700/291 |

FOREIGN PATENT DOCUMENTS

| | | |
|---|---|---|
| JP | 2001-200781 A | 7/2001 |
| JP | 2003-532835 A | 11/2003 |
| JP | 2004-537000 A | 12/2004 |
| JP | 2006-57469 A | 3/2006 |
| KR | 1020030009473 A | 1/2003 |
| KR | 101093003 B1 | 12/2011 |
| WO | 2013/042251 A1 | 3/2013 |
| WO | 2013/060613 A1 | 5/2013 |

OTHER PUBLICATIONS

Office Action dated Dec. 24, 2014 in corresponding KR Patent Application No. 10-2013-0164762.

* cited by examiner

WIND FARM, CONTROL METHOD THEREOF AND WIND POWER GENERATION UNIT

CROSS-REFERENCE TO RELATED APPLICATIONS

This application claims priority to Korean Application No. 10-2013-0164762, filed Dec. 27, 2013, the contents of which are incorporated herein in their entirety.

BACKGROUND

The present disclosure relates to a wind farm, a control method thereof and a wind power generation unit, and more particularly, to a wind farm which protects a wind power generation unit by sensing risk factors of the external environment which is suddenly changed, a control method of the wind farm, and a wind power generation unit.

Wind power generation relates to the conversion of a rotational energy of blades rotating using kinetic energy of wind into electric energy. Recently, wind power generation is in the limelight as eco-friendly energy which does not generate green-house gases.

Figure 1:
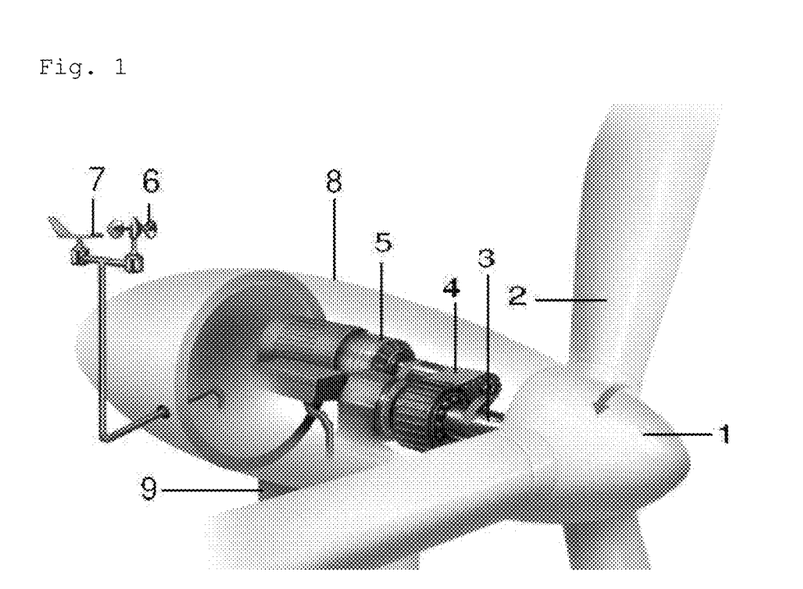
FIG. 1 is a cutaway perspective view showing parts of a wind power generation unit.
Figure 2:
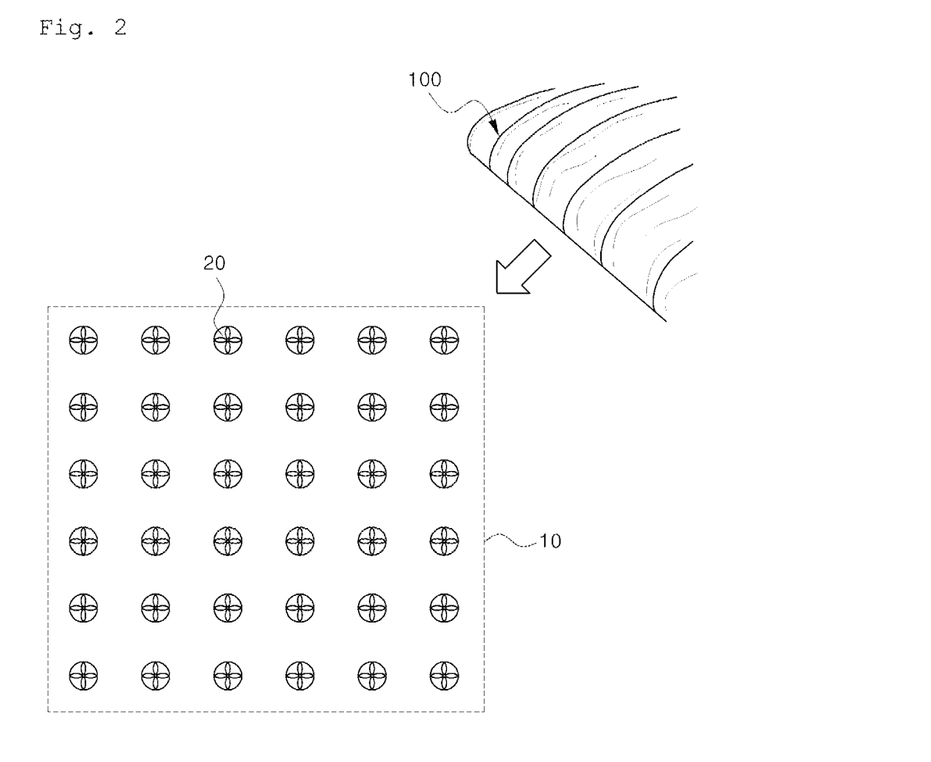
FIG. 2 is a plan view showing a general wind farm and a general external environment risk element.

FIG. 1 illustrates components of a conventional wind power generation unit, and FIG. 2 illustrates a general wind farm and risk factors of the external environment.

For wind power generation, a single wind power generation unit may be installed locally, but in the majority of cases, dozens or hundreds of wind power generation units 20 form a wind farm 10.

The wind power generation units 20 may use kinetic energy of wind, and sensitively react according to changes in external weather environment.

The wind power generation units 20 generally carry out a yawing control to horizontally rotate a nacelle 8 according to a change of wind direction. Moreover, the wind power generation units carry out a pitch control to adjust a pitch angle of blades 2 according to a change of wind speed, so as to prevent a damage of the individual wind power generation unit by inducing the optimum aerodynamic performance and by adjusting a rotational speed when excessively strong wind blows.

In the meantime, through such pitch control and yawing control, the individual wind power generation unit is controlled on the basis of weather observation and information measured by a weathercock 7 and a wind gauge 6 mounted on the wind power generation unit. However, when there is a sudden weather variable which is not forecasted by the weather observation, a predictive control may not be possible, and the individual wind power generation unit may be damaged while the weathercock 7 and the wind gauge 6 are detecting the weather variable.

When a severe local weather change, such as windstorm, tornado, or a local gust of wind, occurs, the wind power generation unit 20 which works normally may be fatally damaged before a control is carried out even though it sensed a risk element.

Particularly, in case of a sudden change in wind direction and wind speed, the unit 20 is damaged due to an excessive increase of rotational speed and vibration of the blades 2.

Moreover, in case of windstorm, sand particles collide against the rotating blades 2, so that the surface coating and the appearance of the blades are damaged and the aerodynamic performance of the surfaces of the blades 2 is deteriorated.

That is, when there is an unexpected change in weather, all of the wind power generation units 20 arranged in the conventional wind farm 10 may be damaged.

SUMMARY

Accordingly, the present disclosure has been made to address the above-mentioned problems, and it is an object of the present disclosure to provide a wind farm, a control method thereof and a wind power generation unit, which can prevent damage of wind power generation units in the wind farm even though an unexpected risk element of a local external environment occurs.

In an embodiment, there is provided a wind farm which includes a plurality of wind power generation units, further including: a sensing part that senses an external environment risk element; and a controlling part that receives a risk signal from the sensing part and controls the wind power generation units in the wind farm.

In another embodiment, there is provided a control method of a wind farm which includes a plurality of wind power generation units, the control method including: a risk element sensing step of sensing an external environment risk element by a sensing parts which are mounted at predetermined positions inside or outside the wind farm; and a power generation unit controlling step of controlling operation conditions of the wind power generation units in the wind farm based on the sensed result of the risk element sensing step.

In a further embodiment, there is provided a wind power generation unit which includes: a tower standing on the ground or on the sea; a nacelle located at the top of the tower; and a blade-hub assembly which is located at one side of the front of the nacelle that converts kinetic energy of wind into rotary energy, further including: a sensing part disposed at one side of the wind power generation unit that senses an external environment risk element.

The risk sensor according to an embodiment is installed at a position which is spaced apart from the wind farm at a predetermined distance, namely, at an exterior region of the wind farm, and includes a sensing part for sensing an external environment risk element. The external environment risk element may be wind containing dust or sand.

Embodiments of the present disclosure may prevent damage of wind power generation units in the wind farm even though there is an unexpected risk element of a local external environment.

In more detail, embodiments of the present disclosure may receive a risk signal from some of the wind power generation units having sensing parts or from the exterior region, and then, anticipatorily controls the individual wind power generation units of the wind farm based on the risk signal so as to prevent damage of the wind power generation units.

BRIEF DESCRIPTION OF THE DRAWINGS

The above and other objects, features and advantages of the present disclosure will be apparent from the following detailed description of the preferred embodiment of the present disclosure in conjunction with the accompanying drawings, in which.

DETAILED DESCRIPTION

Reference will be now made in detail to embodiments of the present disclosure with reference to the attached drawings.

Prior control methods for a wind farm 10 just sought to prevent further damage after occurrence of a first damage because the corresponding wind power generation unit 20 could be controlled only when the unit 20 senses a local weather change after the local weather change occurred.

In contrast, the present disclosure includes sensing parts 21 and 51 for previously sensing an external environment risk element, and hence, can carry out a predictive control of the entire or some of wind power generation units 20 installed in the wind farm 10 based on information measured from the sensing parts 21 and 51.

In an embodiment, the wind farm 10 includes a plurality of wind power generation units 20.

Moreover, the wind farm 10 according to an embodiment includes the sensing parts 21 and 51 for sensing an external environment risk element 100 and a controlling part for controlling the wind power generation units 20 in the wind farm 10 by receiving a risk signal from the sensing parts 21 and 51.

Figure 7:
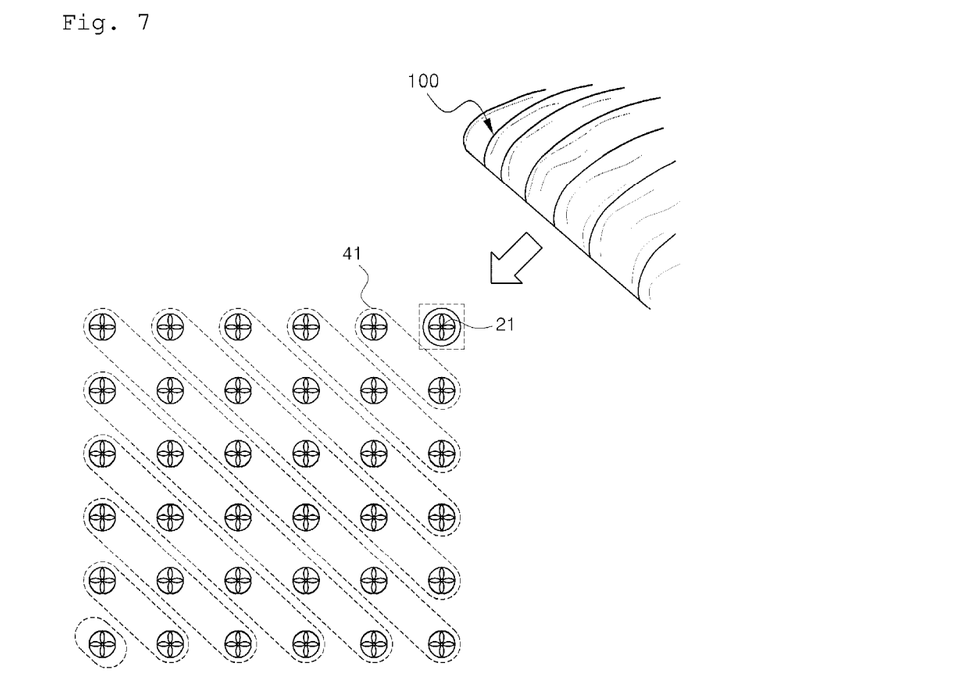
FIGS. 7 to 8 are plan views showing a control range of the wind farm according to an embodiment of the present disclosure.
Figure 8:
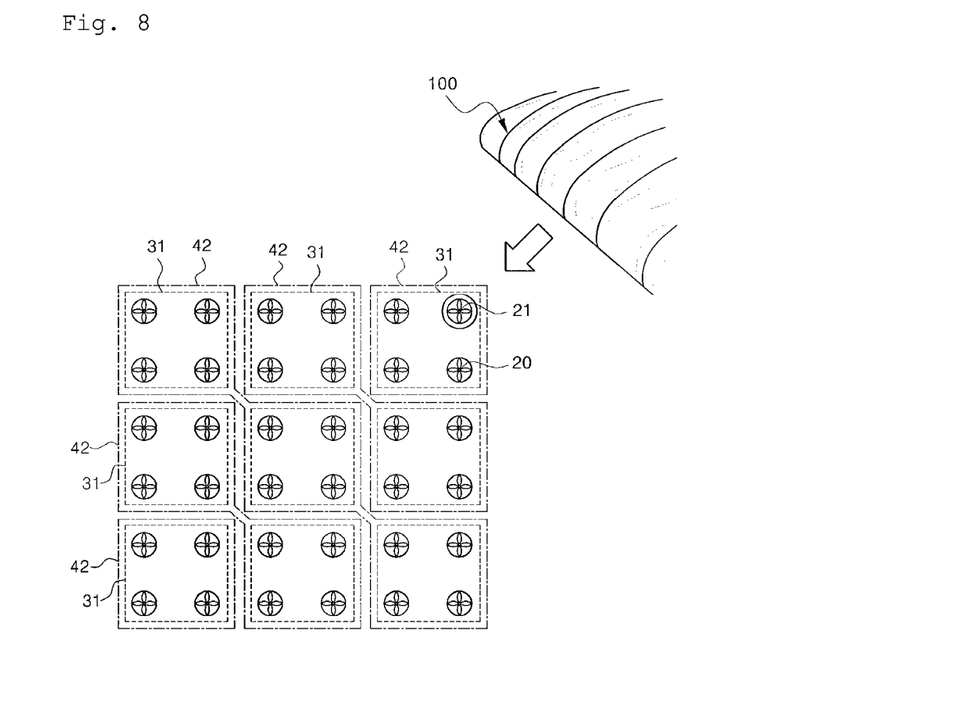
Figure 9:
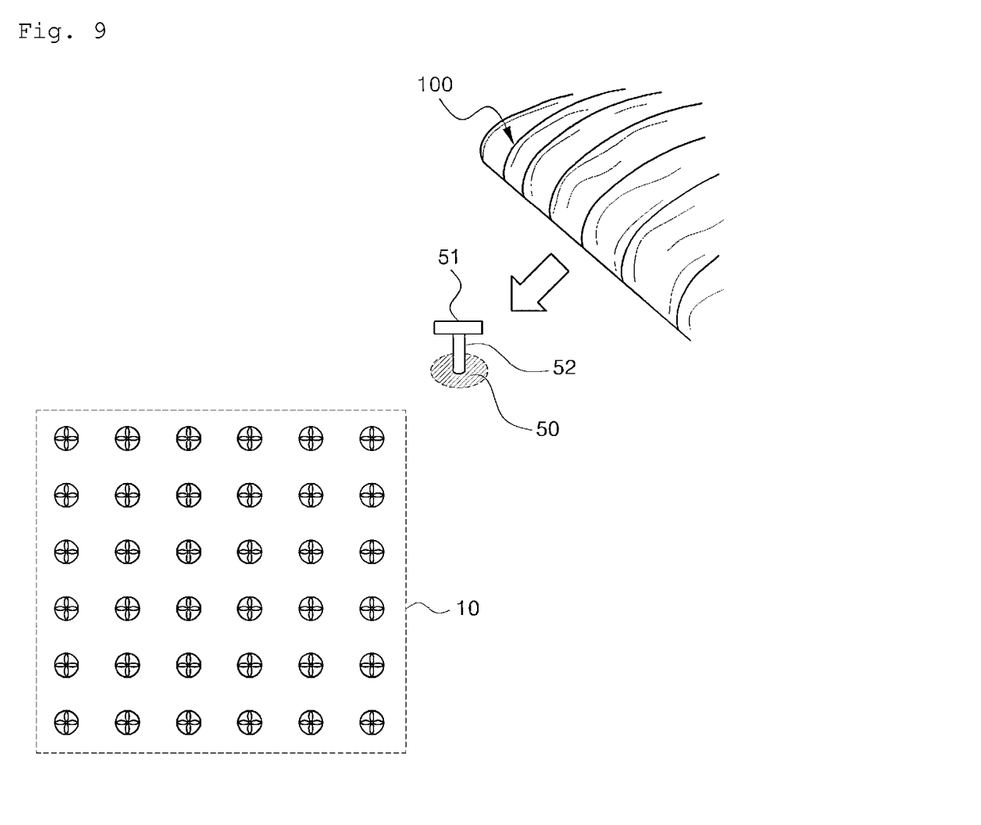
FIGS. 9 to 11 are plan views showing an external sensing location of the wind farm according to an embodiment of the present disclosure.
Figure 10:
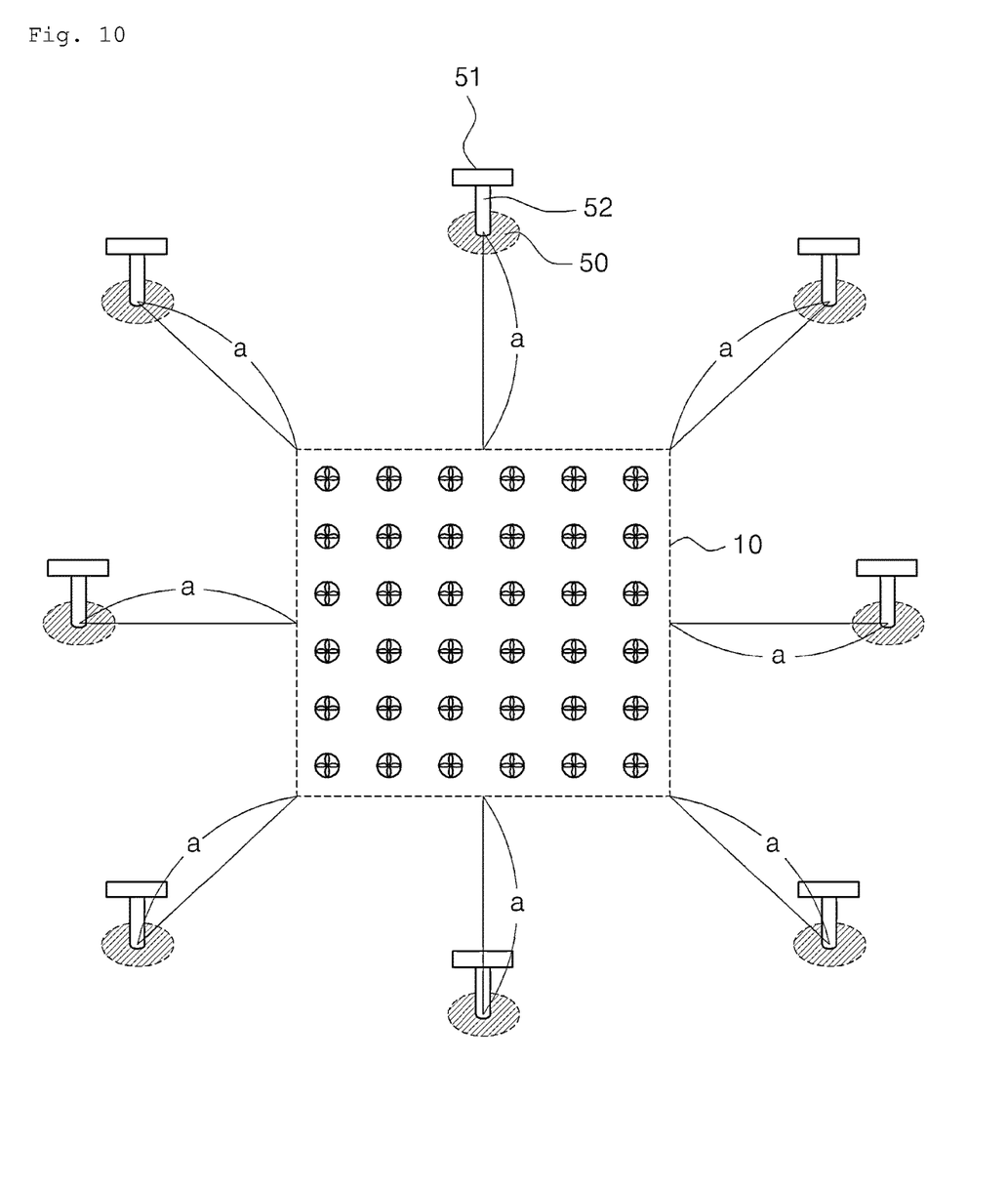
Figure 11:
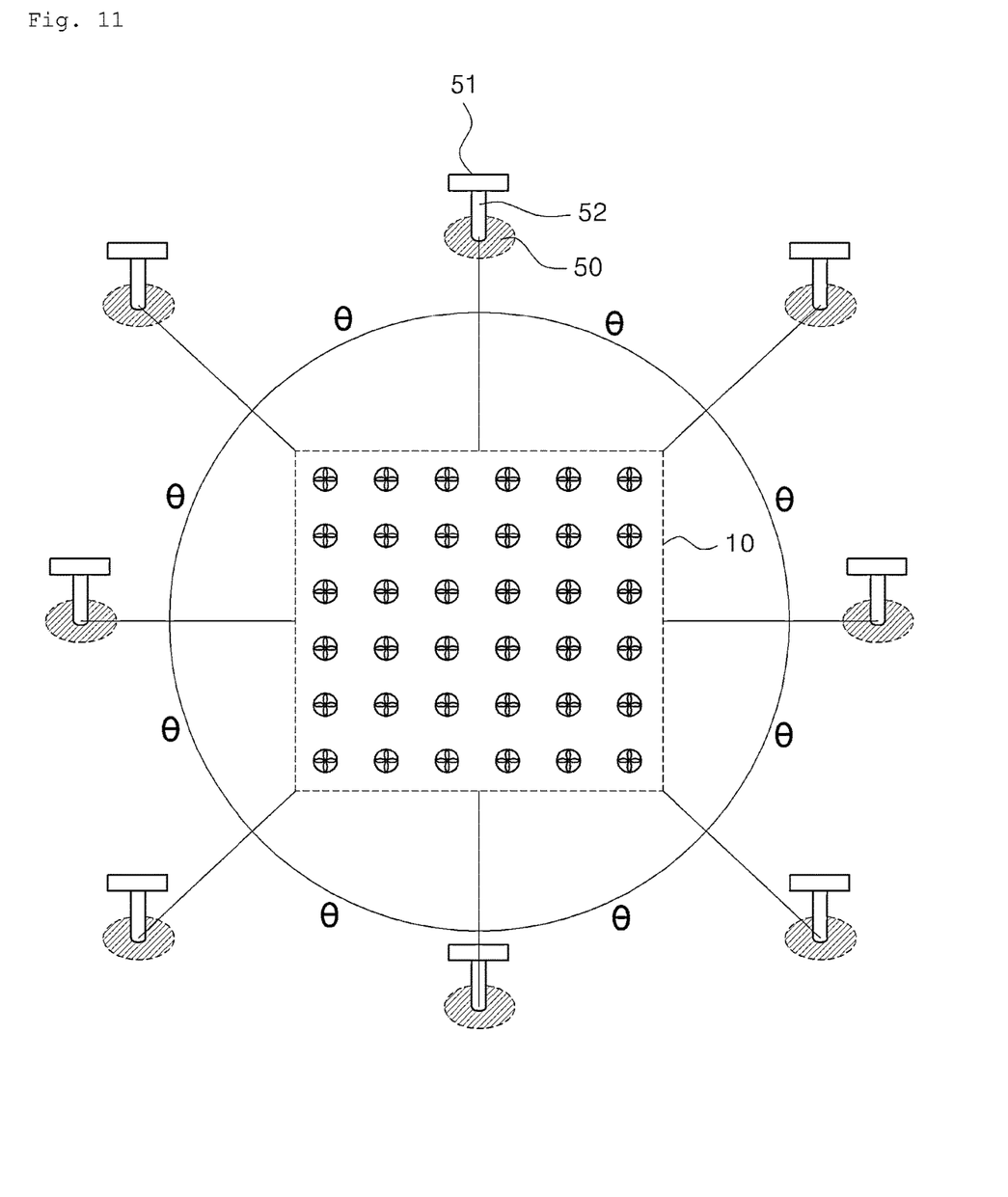

The sensing part 21 may be installed on some of the wind power generation units as shown in FIGS. 3 to 8, or the sensing part 51 may be installed at an exterior region which is spaced apart from the wind farm 10 at a predetermined distance as shown in FIGS. 9 to 11.

First, in case that the sensing part 21 is installed on some of the wind power generation units, when the sensing part 21 senses a local sudden weather change, such as a gust of wind, a windstorm or a tornado, namely, an external environment risk element, the sensing part 21 sends a signal of the external environment risk element to the controlling part which controls the entire wind farm 10. After that, the controlling part which receives the signal controls the remaining wind power generation units 20, so that at least the remaining wind power generation units can be protected from the external environment risk element.

Furthermore, in case that the sensing part 21 is installed at the exterior region of the wind farm 10, the sensing part 21 senses the external environment risk element and sends a signal of the external environment risk element to the controlling part which controls the entire wind farm 10. After that, the controlling part which receives the signal controls the remaining wind power generation units 20, so that all of the wind power generation units in the wind farm 10 can be protected from the external environment risk element. The control of the controlling part will be described in more detail later.

Hereinafter, in order to describe the embodiments in more detail, the external environment risk element is divided into several cases: 1) in case of wind containing dust or sand; 2) in case of a sudden change of wind speed; and 3) in case of a sudden change of wind direction.

The reason to divide the cases is to describe controlled objects and methods in detail, and it is natural that a plurality of the external environment risk elements in the cases of 1) to 3) can occur at the same time. In this instance, control methods of the cases can be applied simultaneously.

First, the case that the external environment risk element is wind containing dust or sand will be described.

The sensing parts 21 and 51 for sensing the wind containing dust or sand will be described in more detail.

In this case, the sensing parts 21 and 51 include particle counters.

The particle counters may be measuring devices for measuring size and distribution of dust in the air.

Particle counters may function in various ways. The principle of using light scattering of a light source, such as a laser, will be described as follows.

First, a vacuum pump collects air in a space to be measured, and then, the collected air moves along a pipe and passes by an inner laser (light) sensor. The particle counter can find the number of dust particles using the principle that light goes straight in clean air but is scattered when meeting with dust or other particles and can measure the size of dust particles using the quantity of scattered light.

In the meantime, the sensing parts 21 and 51 may be infrared sensors, and the infrared sensors may adopt a method similar with the method that an infrared (or photoelectric) smoke sensor senses smoke.

The infrared sensor may output infrared rays of a predetermined output amount from a light emitting part and measure concentration or density of dust or sand in the air based on an input amount of the infrared rays from a light receiving part corresponding to the light emitting part, namely, based on a light receiving amount.

Meanwhile, when the sensing parts 21 and 51 sense dust or sand of a danger level over a certain amount, it is preferable to completely stop the operation of each wind power generation unit 20 or to rotate the blades 2 at a low speed by reducing the rotational speed of the blades 2.

For instance, in case that a sandstorm is blowing at a speed of 30 m/s, assuming that a rotational speed of the tip of the blade 2 is about 50 m/s, a relative speed of sand colliding against the surface of the blade 2 is increased to 80 m/s. Therefore, reducing the rotational speed is an effective solution to prevent damage of the surface of the blade 2 by dust or sand.

In order to reduce the rotational speed of the blades 2, first, there is a method to control a pitch angle. Pitch control controls an incident direction angle to the wind of the blades 2 mounted on a hub 1. That is, when an incident angle of the blade to the wind is controlled, amounts of a lift force and an impingement force influencing on the blades 2 can be controlled. A general pitch control is applied to increase a rotational speed, but in an embodiment, the principle which is opposed to the general pitch control is applied.

Alternatively, a brake system to reduce the rotational speed of the blades 2 or to stop the blades 2 may be prepared.

Various brake methods may be applied to the brake system, and hereinafter, several examples of the brake methods will be described.

First, a hub brake which fixes a frame of a nacelle 8 and the hub 1 together may be considered. The hub 1 is mounted in front of the frame of the nacelle 8, and two or three blades 2 are mounted on the side of the hub 1. Here, the hub brake includes a friction element disposed between the frame of the nacelle 8 and the hub 1 which rotates on the frame of the nacelle 8 in order to reduce the rotational speed.

The brake system may be a shaft brake which fixes the frame of the nacelle 8 and a shaft 3 together.

The shaft 3 is mounted between the hub 1 and a generator 5 or a gear box 4 in order to transfer a rotational force. The shaft 3 is mounted inside the frame of the nacelle 8, and the shaft brake includes a friction element disposed between the frame of the nacelle 8 and the shaft 3 in order to reduce the rotational speed of the shaft 3, thus reducing the rotational speed of the blades 2.

Alternatively, a generator brake which is mounted inside the generator 5 to reduce rotation of a rotor of the generator 5 may be applied to the brake system. The generator brake may adopt one of a method of reducing the speed using an electromagnetic force inside the generator 5 and a method of directly reducing a rotational speed of a rotary shaft inside the generator 5.

Second, the case that the external environment risk element is the sudden change of the local wind direction will be described.

When a change in wind direction is sensed, a yawing system of each of the wind power generation units 20 is controlled to rotate the nacelle 8 in such a manner that the front face of the nacelle 8 faces the changed wind direction.

The yawing control locates the front face of the nacelle 8 in the wind direction by rotating the nacelle 8 mounted at the upper portion of a tower 9 in a horizontal direction based on the tower 9.

The conventional wind power generation unit 20 that also has the weathercock 6 can carries out yawing control to locate the front face of the nacelle 8 in the changed wind direction when the weathercock 6 senses a change in wind direction, but the yawing control according to the embodiment of the present disclosure is carried out based on information of the wind direction sensed by another wind power generation unit or sensed from outside of the wind farm 10.

A general yawing control has a disadvantage in that it is difficult to follow the changed speed when the individual wind power generation unit senses a sudden change in speed because the rotational speed is very slow under the general yawing control. Moreover, the general yawing control has another disadvantage in that the lifespan of the wind generator is reduced due to occurrence of unnecessary vibration because wind blows to the blades 2 in an abnormal direction during the yawing control.

However, an embodiment of the present disclosure has an advantage in that it can secure a sufficient time to carry out the yawing control because the sensing parts 21 and 51 mounted on another wind power generation unit spaced apart from the corresponding wind power generation unit or the sensing parts 21 and 51 mounted at an exterior region of the wind farm sense the change in wind direction.

Meanwhile, embodiments of the present disclosure may enhance the generation quantity of the individual wind power generation unit 20 by carrying out the yawing control while predicting a change in wind direction.

On the other hand, in case that it is worried about safety of the wind power generation unit 20 due to an extreme change in wind direction, it is preferable that the control to reduce the rotational speed of the blades 2 like the first case be carried out together with the yawing control.

Third, the case that the external environment risk element is a local sudden change of wind speed will be described.

The first method to reduce the rotational speed of the blades 2 is to control the pitch angle. Pitch control controls an incident direction angle to the wind of the blades 2 mounted on a hub 1. That is, when an incident angle of the blade to the wind is controlled, amounts of a lift force and an impingement force influencing on the blades 2 can be controlled. Here, the pitch control is carried out to increase the rotation speed of the blades 2 when the wind speed is increased rapidly, and also to control a pitch in the direction to increase the rotational speed when the wind speed is reduced.

Alternatively, a brake system to reduce the rotational speed of the blades 2 or to stop the blades 2 may be prepared, in case that a sudden increase of wind speed is sensed.

Various brake methods may be applied to the brake system, and hereinafter, several examples of the brake methods will be described.

First, a hub brake which fixes a frame of a nacelle 8 and the hub 1 together may be considered. The hub 1 is mounted in front of the frame of the nacelle 8, and two or three blades 2 are mounted on the side of the hub 1. Here, the hub brake includes friction means disposed between the frame of the nacelle 8 and the hub 1 which rotates on the frame of the nacelle 8 in order to reduce the rotational speed.

The brake system may be a shaft brake which fixes the frame of the nacelle 8 and a shaft 3 together.

The shaft 3 is mounted between the hub 1 and a generator 5 or a gear box in order to transfer a rotational force. The shaft 3 is mounted inside the frame of the nacelle 8, and the shaft brake includes a friction element disposed between the frame of the nacelle 8 and the shaft 3 in order to reduce the rotational speed of the shaft 3, thus reducing the rotational speed of the blades 2.

Alternatively, a generator brake which is mounted inside the generator 5 to reduce rotation of a rotor of the generator 5 may be applied to the brake system. The generator brake may adopt one of a method of reducing the speed using an electromagnetic force inside the generator 5 and a method of directly reducing a rotational speed of a rotary shaft inside the generator 5.

Till now, the cases corresponding to the external environment risk elements are described.

Hereinafter, installation positions of the sensing parts will be described in more detail.

First, as shown in FIGS. 3 to 8, the sensing part 21 may be installed on at least one wind power generation unit 20 of the wind farm 10.

In order to sense more precisely, the sensing parts may be installed on all of the wind power generation units 20 in the wind farm 10.

Figure 3:
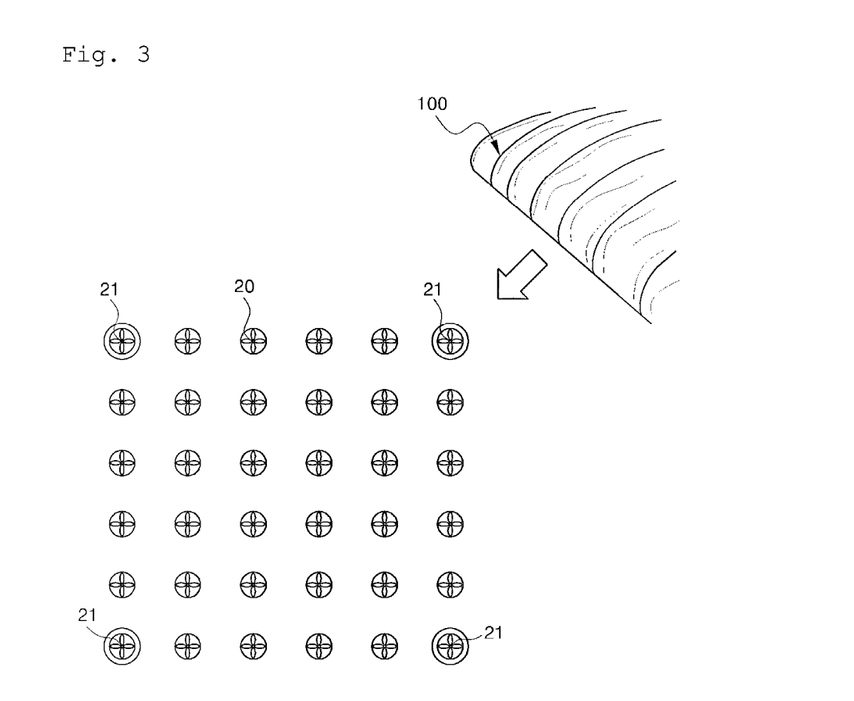
FIGS. 3 to 6 are plan views of a wind farm according to an embodiment of the present disclosure including an arrangement of wind power generation units respectively having sensing parts.
Figure 4:
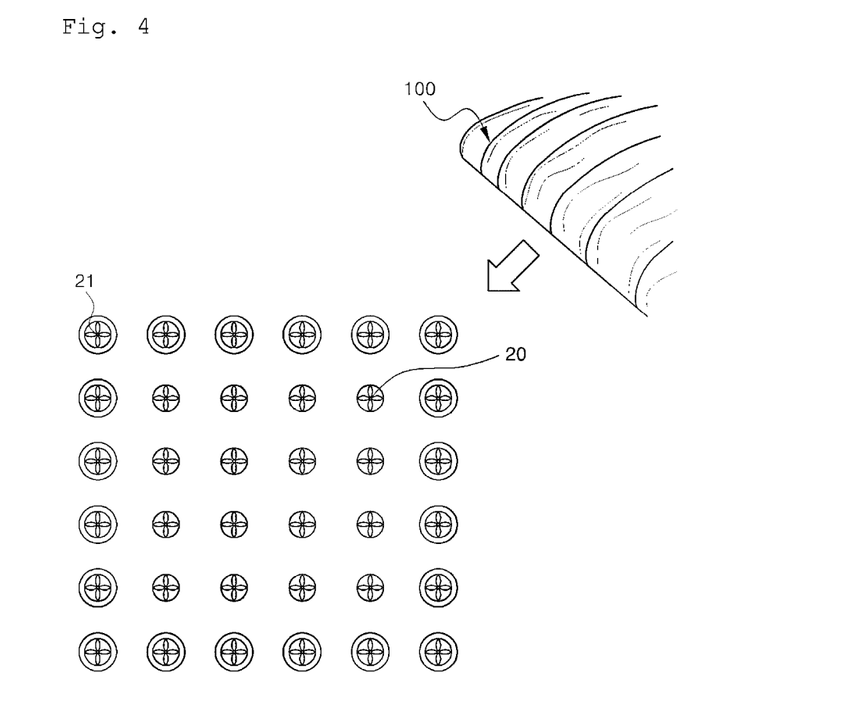

Additionally, in order to sense effectively, as shown in FIGS. 3 and 4, the sensing part may be installed on at least one wind power generation unit 20 located at an edge of the wind farm 10.

Figure 5:
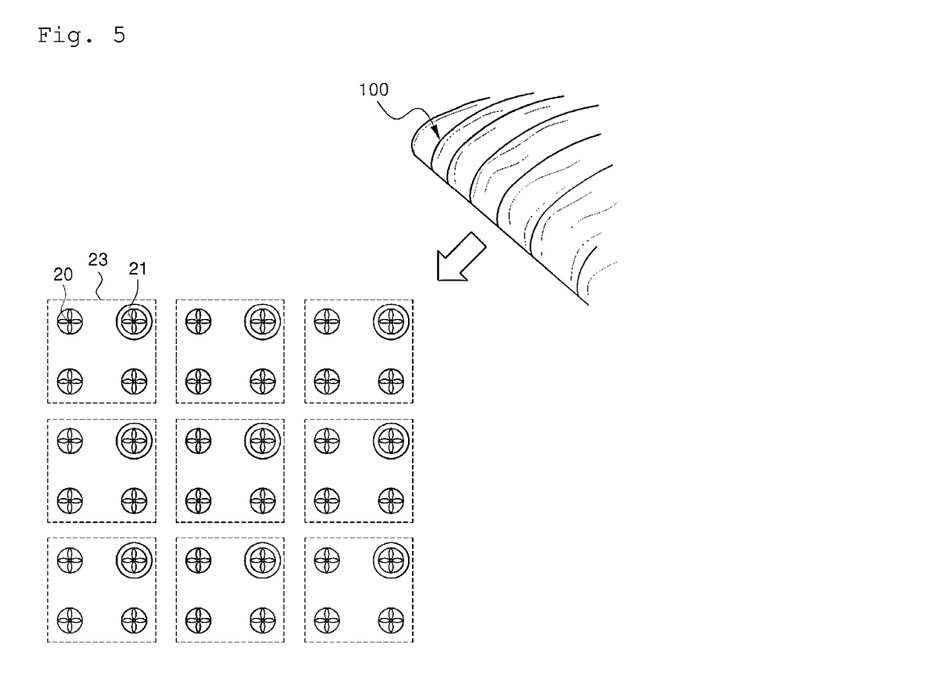
Figure 6:
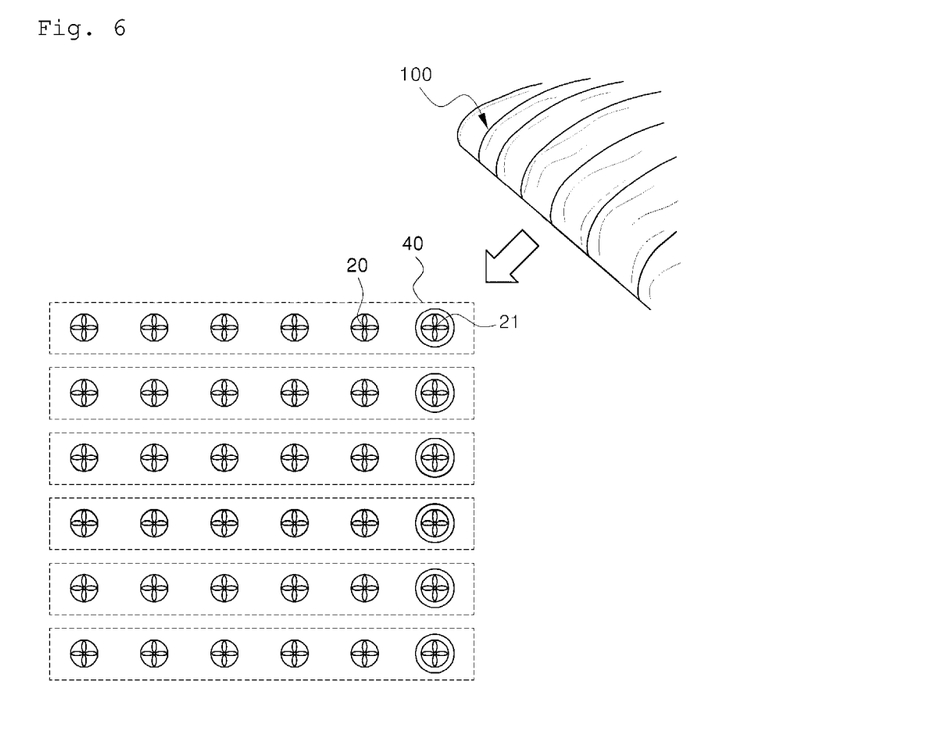

Moreover, as shown in FIGS. 5 and 6, it may be also considered that the wind farm 10 is divided into areas 23, 40 of a certain unit and the sensing part 21 is installed on at least one wind power generation unit 20 per the divided unit areas 23, 40.

FIGS. 3 to 8 illustrate the case that the sensing part 21 is mounted on the wind power generation unit 20 in the wind farm 10, but FIGS. 9 to 11 illustrate the case that the sensing part 51 is mounted at a sensing location 50 disposed in the external region spaced apart from the wind farm 10 in which a plurality of the wind power generation units 20 are concentrated.

As described above, embodiments of the present disclosure can carry out predictive control in safety since the sensing part 51 is mounted at the sensing location 50 in the external region of the wind farm.

In case that the sensing part 21 is mounted inside the wind farm, at least one wind power generation unit 20 may be unavoidably damaged in the moment of sensing the risk element. However, in the case that the sensing part 51 is mounted at the sensing location 50 in the external region, embodiments of the present disclosure can anticipatorily control the wind power generation units 20 to as to prevent damages while the external environment risk element is moved from the external region to the wind farm 10.

Furthermore, as shown in FIG. 9, it is preferable that the external sensing location 50 be mounted on the way that the external environment risk element moves.

For instance, in case that a windstorm is generated from the west of the wind farm 10, it is preferable that the sensing location 50 be formed at a point spaced apart to the west from the wind farm 10 at a predetermined distance.

On the other hand, as shown in FIGS. 10 and 11, a plurality of the external sensing locations 50 may be formed at predetermined distances and/or angles from one another in such a way as to surround the wind farm 10.

For instance, as shown in FIG. 10, a plurality of the external sensing locations 50 may be formed at points within an a-kilometer radius from the wind farm 10.

Alternatively, as shown in FIG. 11, a plurality of the external sensing locations 50 may be radially formed at θ-degree intervals from the wind farm 10. FIGS. 9 to 11 show exemplary arrangement structures of the sensing locations, and the present disclosure is not restricted to those arrangement structures.

In the meantime, in case that the sensing parts 21 and 51 are mounted on the wind power generation units 20, they can be mounted at various positions of the wind power generation units 20. In this instance, it is preferable that the sensing parts be located at relatively upper portions of the wind power generation units 20, such as a front part of the hub 1, a rear part of the upper face of the nacelle 8, and upper end portion of the tower 9.

Furthermore, it is also preferable that the sensing part 51 mounted at the external sensing location 50 be located at an upper end portion of another tower 52 which is separately disposed.

Till now, the arrangement structures and installation locations of the sensing parts 21 and 51 are described.

Hereinafter, a control range of the controlling part will be described.

First, when a risk signal is sensed, the all of the wind power generation units 20 in the wind farm 10 may be controlled together as a set. For instance, when the sensing part 21 mounted on the outermost wind power generation unit 20 senses the risk signal, all of the remaining wind power generation units 20 may be decelerated together.

The above method may be a safer control method, but may also be less effective in comparison with the stepwise control discussed following.

Referring to FIG. 7, a first method of stepwise control is that the wind power generation units 20 are divided into control groups 41 at predetermined intervals based on a distance from the sensing part 21 and control is carried out in consecutive order from the wind power generation units 20 belonging to the control group within a short distance from the sensing part 21.

It is a method to control the wind power generation units 20 which meet the external environment risk element in consecutive order step by step. Because the wind power generation units 20 are controlled step by step, there is no need to previously reduce the rotational speed.

Alternatively, as shown in FIG. 8, a second method of the stepwise control is that the wind power generation units 20 installed in the wind farm 10 are divided into several control groups 42 per a certain unit area 31 and control is carried out in consecutive order by each control group. Here, the consecutive order refers to control that is carried out consecutively from the control group within a short distance based on distances between the sensing parts 21 and the control groups.

Meanwhile, an unnecessary reduction control may occur based on a wrong risk signal.

In order to solve the above-mentioned problem, a method for judging the truth of the risk signal may be added.

That is, the control method may include the steps of receiving a risk signal from the sensing part, judging the truth of the risk signal, and sending the risk signal to the wind power generation units 20 only when it is judged that the risk signal is true.

It is preferable that the truth of the risk signal be judged through comparison between previously stored reference data and measurement results of the sensing parts 21 and 51. Here, it is preferable that the reference data be collected in the region where the sensing parts are mounted. Furthermore, the reference data may be stored annually by a predetermined time unit in order to enhance reliability.

That is, the control method is to compare the risk signal obtained at the present point with the annual data and to judge whether the risk signal corresponds to an ordinary level or indicates the occurrence of a specific change.

For instance, density of sand in the air at the present point is compared with density of sand in the air which was measured on the corresponding date of a normal year when density of sand in the air was normal, and then, it is judged whether or not a windstorm occurred.

Even though the density of sand at the present point is relatively higher, if it is similar with the normal state of the normal year, because it is judged that there is no windstorm, the risk signal is not transferred to the wind power generation units 20 from the controlling part.

More precisely, it may be considered to compare a real time data measured by the sensing parts 21 and 51 with the reference data stored during the sensing time on the sensing date of the one-year period.

In the meantime, it is preferable that the reference data be stored by the same weather condition unit. In spite of the same date, because the density of sand may be remarkably varied according to weather conditions, such as snow or rain, it is preferable to collect the reference data also by the weather condition unit.

In this instance, in order to judge the truth of the risk signal, the real time data measured by the sensing parts 21 and 51 is compared with the reference data stored under the condition that is the most similar with the present weather condition.

Hereinafter, the steps of sending the risk signal from the sensing parts 21 and 51 to the controlling part and sending a control signal from the controlling part to each of the wind power generation units 20 will be described.

First, it is preferable to transfer the risk signal and the control signal between the sensing parts 21 and 51 and the wind power generation units 20 using the existing wired electric grid communication network without additional communication network.

Meanwhile, it is also preferable to transfer the risk signal and the control signal between the sensing parts 21 and 51 and the wind power generation units 20 using a separate wireless communication network.

The wired communication method may cause a problem in signal transmission due to a physical damage of the communication network, and the wireless communication method may cause a problem in signal transmission due to disruption of wireless communication.

Therefore, it is preferable to use i) the wired electric grid communication network and ii) the wireless communication network in order to smoothly transmit the risk signal and the control signal.

Additionally, it is preferable to verify errors in the signals by comparing i) the signal of the wired electric grid communication network and ii) the signal of the wireless communication network with each other.

Till now, the configuration of the wind farm 10 according to an embodiment is described.

Hereinafter, a control method of the wind farm according to an embodiment will be described. Repetition of the above-mentioned contents will be omitted, and the control method will be described with a controlling step as the central figure.

First, the control method of the wind farm according to an embodiment corresponds to a control method of the wind farm including a plurality of the wind power generation units 20.

Figure 12:
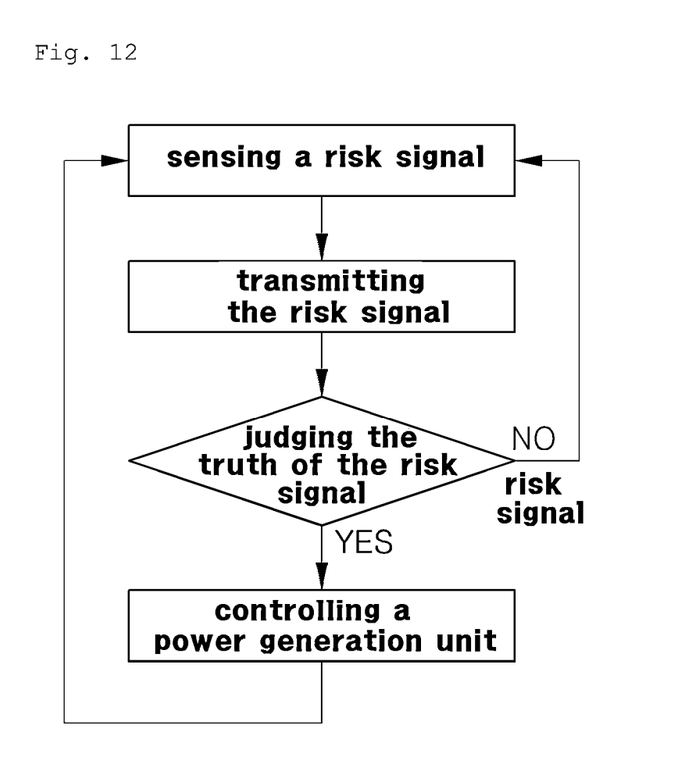
FIG. 12 is a flow chart showing a control method of the wind farm according to an embodiment of the present disclosure.

As shown in FIG. 12, the control method of the wind farm according to an embodiment includes: i) a risk element sensing step; ii) a risk signal sending step; iii) a risk signal truth judging step; and iv) a power generation unit controlling step.

First, the risk element sensing step and the power generation unit controlling step of the control method will be described.

The risk element sensing step is a step of sensing an external environment risk element from the sensing parts 21 and 51 which are mounted at predetermined positions inside or outside the wind farm 10. Here, the inside may include the individual wind power generation units 20 in the wind farm 10, and the outside may include the external sensing locations 50 described above.

Meanwhile, the power generation unit controlling step is a step of controlling operation conditions of the wind power generation units 20 in the wind farm 10 based on the sensed result of the risk element sensing step. Moreover, the external environment risk element in the risk element sensing step is the wind containing dust or sand, the local change of wind direction or the local change of wind speed around the positions where the sensing parts 21 and 51 are mounted.

In the meantime, in case of sand or wind, it is preferable that the sensing parts 21 and 51 measure density of dust particles or sand particles in the air using the particle counter. The particle counter is described above, and hence, its description will be omitted.

Furthermore, each of the sensing parts 21 and 51 may include an infrared sensor. the infrared sensor outputs infrared rays of a predetermined output amount from a light emitting part and measures concentration or density of dusts or sands in the air based on an input amount of the infrared rays from a light receiving part corresponding to the light emitting part.

In the meantime, in the risk element sensing step, the sensing part 21 may be mounted on at least one wind power generation unit 20 of the wind farm 10 in order to measure the external environment risk element around the sensing part 21.

Here, in the risk element sensing step, the sensing part 21 may be mounted on all of the wind power generation units 20 of the wind farm 10 or on at least one wind power generation unit 20 located at the edge of the wind farm 10, in order to measure the external environment risk element around the sensing part 21.

Additionally, the wind farm 10 may be divided into areas of a certain unit and the sensing part 21 may be installed on at least one wind power generation unit 20 per the divided unit area in order to measure the external environment risk element around the sensing part 21.

In the meantime, in the risk element sensing step, the sensing part 21 may be mounted at the sensing location 50 disposed in the external region spaced apart from the wind farm 10 in which a plurality of the wind power generation units 20 are concentrated, in order to measure the external environment risk element around the sensing part 21.

Figure 13:
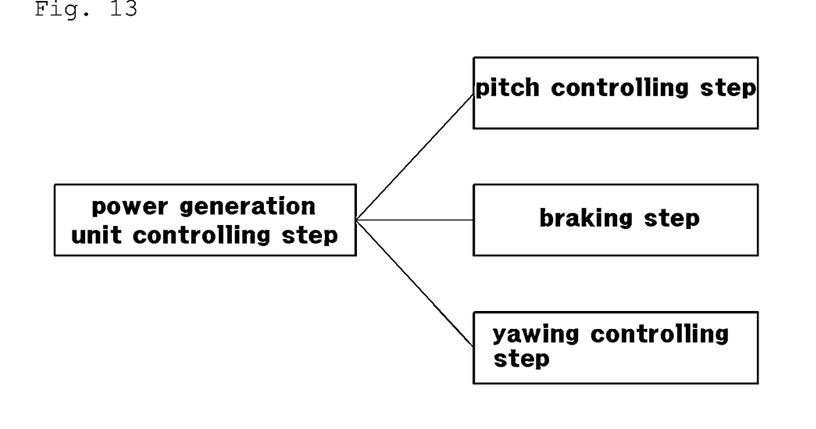
FIG. 13 is a block diagram showing a wind power generation unit controlling step of the control method of the wind farm according to an embodiment of the present disclosure.

As shown in FIG. 13, the power generation unit controlling step includes at least one of i) a pitch control step, ii) a braking step, and iii) a yawing control step.

First, the pitch control step is to reduce the rotational speed of the blades 2 by controlling a pitch angle of the blades 2 of the wind power generation unit 20. When the wind speed is decreased, the control is carried out in a direction to increase the rotational speed.

In addition, the braking step is to decrease or stop the rotational speed of the blades 2.

Here, the braking step may be carried out by operating a hub brake which fixes the frame of the nacelle 8 and the hub 1 together, by operating a shaft brake which fixes the frame of the nacelle 8 and the shaft 3 together, or by operating a generator brake which is mounted inside the generator 5 to reduce the rotation of the rotor of the generator 5.

Moreover, when the sensing parts 21 and 51 sense a risk signal, the yawing control step is carried out to rotate the direction of the nacelle 8 in such a way that the front face of the nacelle 8 faces the changed wind direction by controlling the yawing system of the wind power generation unit 20.

From a viewpoint of a control sequence or range, first, the power generation unit controlling step controls the entire of the wind power generation units 20 of the wind farm 10 together.

Meanwhile, the wind power generation units 20 may be divided into control groups at predetermined intervals based on a distance from the sensing part 21 and the control is carried out in consecutive order from the wind power generation units 20 belonging to the control group within a short distance from the sensing part 21. Alternatively, the wind power generation units installed in the wind farm 10 may be divided into several control groups per certain unit area and the control is carried out in consecutive order by each control group.

Furthermore, preferably, the risk signal truth judging step may be further included. Only when it is judged that the risk signal sensed in the risk signal sensing step is true in the risk signal truth judging step, the wind power generation units 20 are controlled in the power generation unit controlling step.

In the risk signal truth judging step, the truth of the risk signal is judged by a difference between the previously stored reference data and the result measured by the sensing parts 21 and 51.

Additionally, the reference data is collected in the region where the sensing parts are mounted and stored annually by a predetermined time unit. The truth of the risk signal is judged through comparison of a real time data measured by the sensing parts 21 and 51 with the reference data stored during the sensing time on the sensing date of the one-year period.

In addition, preferably, the reference data is collected in the region where the sensing parts are mounted and stored by the weather condition unit, and the truth of the risk signal is judged through comparison of the real time data measured by the sensing parts 21 and 51 with the reference data stored under the condition that is the most similar with the present weather condition.

Meanwhile, in the risk signal sensing step, the risk signal sending step for sending the risk signal sensed by the sensing parts 21 and 51 to the power generation unit controlling step may be further included.

In the risk signal sending step, the risk signal and the control signal may be mutually transmitted between the sensing parts 21 and 51 and the wind power generation units 20 using the wired electric grid communication network.

Alternatively, the risk signal and the control signal may be mutually transmitted between the sensing parts 21 and 51 and the wind power generation units 20 using the wireless communication network.

In order to make the signal transmission more reliable, it is preferable to transmit the risk signal and the control signal between the sensing parts 21 and 51 and the wind power generation units 20 using i) the wired electric grid communication network and ii) the wireless communication network together.

In this instance, a signal error verifying step for verifying errors in the signals by comparing i) the signal through the wired electric grid communication network and ii) the signal through the wireless communication network with each other may be further included.

Till now, the control methods of the wind farm according to an embodiment are described.

Hereinafter, in a viewpoint of the individual wind power generation unit, an embodiment will be described.

The wind power generation unit according to an embodiment includes: a tower 9 standing on the ground or on the sea; a nacelle 8 located at the top of the tower 9; and a blade-hub assembly which is located at one side of the front of the nacelle 8 for converting kinetic energy of win into rotary energy.

Moreover, the wind power generation unit 20 preferably further includes a sensing part 21 disposed at one side thereof for sensing an external environment risk element. In this instance, the one side is preferably located at a relative upper portion, and also may be located at various positions, such as the front part of the hub 1, the upper surface of the nacelle 8, or the upper portion of the tower 9.

Hereinafter, the wind power generation unit 20 will be described based on that the external environment risk element is wind containing dust or sand.

The sensing part 21 may include a particle counter or an infrared sensor.

Because the particle counter and the infrared sensor are described above, their detailed description will be omitted.

Meanwhile, when the sensing part 21 senses a risk signal, it is preferable to reduce the rotational speed of the blades 2 by controlling the pitch angle of the blades 2. Here, the sensing part is not the sensing part mounted on the corresponding wind power generation unit but is the sensing part mounted on another wind power generation unit or on the external sensing location 50.

On the other hand, a brake system may be included in order to decrease or stop the rotational speed of the blades 2 may include at least one of: i) a hub brake which fixes the frame of the nacelle 8 and the hub together; ii) a shaft brake which fixes the frame of the nacelle 8 and a shaft 3 together; and iii) a generator brake which is mounted inside a generator 5 to reduce rotation of a rotor of the generator 5.

Meanwhile, the measurement result measured by the sensing part 21 may be transmitted through the electric grid network or through the wireless communication network.

In the meantime, a risk element sensing device according to an embodiment is a sensing device which is installed at the external location 50 formed at a predetermined interval away from the wind farm 10.

The risk element sensing device includes a sensing part 51 for sensing the external environment risk element, and the external environment risk element is the wind containing dust or sand.

Meanwhile, it is preferable that the sensing part 51 include a particle counter or an infrared sensor.

Moreover, it is preferable to include a risk signal sending part for sending the measured result of the sensing part through the electric grid network in order to transmit the sensed risk signal to the wind farm 10, and according to circumstances, the measured result may be transmitted through the wireless communication network. Of course, as described above, the electric grid network and the wireless communication network may be used together in order to enhance reliability in transmission of signals.

In more detail, when the risk signal sensed by the sensing part 51 is transmitted using i) the wired communication network and ii) the wireless communication network, a signal verifying part for verifying errors of the signal by comparing the signal through i) the wired communication network with the signal through ii) the wireless communication network may be further included.

The position relations used to describe embodiments of the present disclosure are described referring to the attached drawings and can be varied according to aspects of the embodiments.

Additionally, unless otherwise defined herein, it will be understood that all words or terms used in the specification and claims should be interpreted as the meaning defined in commonly used dictionaries in the art. It will be further understood that the words or terms should be interpreted as having a meaning that is consistent with their meaning in the context of the relevant art and the technical idea of the invention, and should not be interpreted as excessively ideal or formal meaning unless otherwise defined clearly.

While the present invention has been particularly shown and described with reference to the preferred embodiments thereof, it will be understood by those of ordinary skill in the art that simple combinations of the preferred embodiments of the present invention with the conventional inventions or the prior arts or simple modifications of the present invention various changes and modifications belong to the technical scope of the present invention. Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A wind farm that includes a plurality of wind power generation units divided into a plurality of control groups, the wind farm comprising:
   a sensor configured to sense an external environment risk element that is present at the sensor, the sensor being mounted with respect to the wind farm including the divided plurality of wind power generation units, the external environment risk element including wind containing at least one of dust detectable by the sensor and sand detectable by the sensor; and
   a controller configured to receive a risk signal from the mounted sensor and to control the wind power generation units in the wind farm, wherein
   when the risk signal is received, the configured controller controls the wind power generation units by controlling the wind power generation units respectively belonging to the plurality of control groups at a distance from the sensor, where the division of the wind power generation units into the plurality of control groups is based on distance from the sensor at which the external environment risk element is sensed, and
   the control is carried out in consecutive order starting from the wind power generation units belonging to the control group within a shortest distance from the sensor.

2. The wind farm according to claim 1, wherein the external environment risk element further includes at least one of i) a local change of wind direction and ii) a local change of wind speed around a position where the sensor is mounted.

3. The wind farm according to claim 2, wherein
   each wind power generation unit includes a plurality of blades, and
   the controller is configured to control a blade pitch angle of each of the wind power generation units in order to decrease a rotational speed of the blades when the risk signal is received.

4. The wind farm according to claim 2, wherein
   each wind power generation unit includes a plurality of blades,
   the controller is configured to control a brake system to decrease or stop a rotational speed of the blades when the risk signal is received, and
   the brake system includes at least one of:
   i) a hub brake that fixes a frame of a nacelle and a hub together;
   ii) a shaft brake that fixes the frame of the nacelle and a shaft together; and
   iii) a generator brake that is mounted inside a generator to reduce rotation of a rotor of the generator.

5. The wind farm according to claim 2, wherein the controller is configured to rotate a direction of a nacelle such that a front face of the nacelle faces a changed wind direction by controlling a yawing system of each wind power generation unit when the risk signal is received.

6. The wind farm according to claim 1, wherein
   the sensor includes at least one of a particle counter and an infrared sensor, and
   the infrared sensor is configured to output infrared rays of a predetermined output amount from a light emitting part and to measure density of dust or sand in air based on an input amount of the infrared rays from a light receiving part corresponding to the light emitting part.

7. The wind farm according to claim 1, wherein the sensor includes at least one sensor respectively provided for and mounted on:
   i) at least one wind power generation unit in the wind farm;
   ii) all of the wind power generation units in the wind farm;
   iii) at least one wind power generation unit that is located at an edge of the wind farm, or
   iv) at least one wind power generation unit located per a divided unit area of the wind farm, the wind farm being divided into unit areas.

8. The wind farm according to claim 1, wherein
   a sensing location is defined at an external region spaced apart from the wind farm in which a plurality of the wind power generation units are concentrated, and
   the sensor is mounted at the sensing location.

9. The wind farm according to claim 1, wherein
   each wind power generation unit includes a plurality of blades, and
   the controller is configured to control a blade pitch angle of each of the wind power generation units in order to decrease a rotational speed of the blades when the risk signal is received.

10. The wind farm according to claim 1, wherein
    each wind power generation unit includes a plurality of blades,
    the controller is configured to control a brake system to decrease or stop a rotational speed of the blades when the risk signal is received, and
    the brake system includes at least one of:
    i) a hub brake that fixes a frame of a nacelle and a hub together;
    ii) a shaft brake that fixes the frame of the nacelle and a shaft together; and
    iii) a generator brake that is mounted inside a generator to reduce rotation of a rotor of the generator.

11. The wind farm according to claim 1, wherein
    when the risk signal is received, the controller is configured to judge the truth of the risk signal, and to send the risk signal to the wind power generation units only when it is judged that the risk signal is true, and the truth of the risk signal is judged based on a difference between a previously stored reference data and a measurement result of the sensor.

12. The wind farm according to claim 11, wherein
the reference data is collected in a region where the sensor is mounted and is stored annually by a predetermined time unit, and
the truth of the risk signal is judged based on a comparison of real time data measured by the sensor with the reference data stored during a sensing time on a sensing date of a one-year period.

13. The wind farm according to claim 11, wherein
the reference data is collected in a region where the sensor is mounted and is stored by a weather condition unit, and
the truth of the risk signal is judged based on a comparison of real time data measured by the sensor with the reference data stored under a condition that is most similar with a present weather condition.

14. The wind farm according to claim 1, wherein the controller is configured to transmit the risk signal and a control signal between the sensor and the wind power generation units using a wired electric grid communication network and/or a wireless communication network.

15. A wind farm that includes a plurality of wind power generation units, the wind farm comprising:
a sensor configured to sense an external environment risk element; and
a controller configured to receive a risk signal from the sensor and to control the wind power generation units in the wind farm, wherein the controller is configured
to transmit the risk signal and a control signal between the sensor and the wind power generation units using
i) a wired electric grid communication network and
ii) a wireless communication network, and
to verify errors in at least one of the risk signal and the control signal by respectively comparing i) the risk signal and the control signal through the wired electric grid communication network and ii) the risk signal and the control signal through the wireless communication network with each other.

16. A method for controlling a wind farm that includes a plurality of wind power generation units, the method comprising:
dividing the plurality of wind power generation units installed in the wind farm into a plurality of control groups;
sensing an external environment risk element by a sensor that is mounted at a position inside or outside the wind farm including the divided plurality of wind power generation units, the sensor sensing the external environment risk element that is present at the sensor, the external environment risk element including wind containing at least one of dust detectable by the sensor and sand detectable by the sensor; and
controlling operation conditions of the wind power generation units in the wind farm in response to a sensed result of the sensing step, the controlling including:
controlling the wind power generation units respectively belonging to the plurality of control groups at a distance from the sensor, where the division of the wind power generation units into the plurality of control groups is based on distance from the sensor at which the external environment risk element is sensed,
wherein the controlling is carried out in consecutive order starting from the wind power generation units belonging to the control group within a shortest distance from the sensor.

17. The control method according to claim 16, wherein
the sensor is configured to measure density of dust or sand in air using at least one of a particle counter and an infrared sensor, and
the infrared sensor is configured to output infrared rays of a predetermined output amount from a light emitting part and to measure density of dust or sand in air based on an input amount of the infrared rays from a light receiving part corresponding to the light emitting part.

* * * * *